United States Patent
Lemieux

(10) Patent No.: US 6,205,143 B1
(45) Date of Patent: Mar. 20, 2001

(54) SYSTEM SUPPORTING VARIABLE BANDWIDTH ASYNCHRONOUS TRANSFER MODE NETWORK ACCESS FOR WIRELINE AND WIRELESS COMMUNICATIONS

(75) Inventor: Yves Lemieux, Kirkland (CA)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 08/615,096

(22) Filed: Oct. 28, 1996

(51) Int. Cl.[7] ........................................................ H04J 3/12
(52) U.S. Cl. ............................................. 370/395; 370/328
(58) Field of Search .................................... 370/395, 396, 370/397, 398, 399, 352, 353, 328, 354, 355, 537, 535, 536, 538, 522; 375/242

(56) References Cited

U.S. PATENT DOCUMENTS

| | | | |
|---|---|---|---|
| 4,519,068 | * | 5/1985 | Krebs et al. . |
| 5,008,879 | | 4/1991 | Fischer et al. . |
| 5,159,592 | | 10/1992 | Perkins . |
| 5,251,205 | | 10/1993 | Callon et al. . |
| 5,285,494 | | 2/1994 | Sprecher et al. . |
| 5,287,358 | | 2/1994 | Nakayama . |
| 5,289,468 | | 2/1994 | Yoshida . |
| 5,327,421 | | 7/1994 | Hiller et al. . |
| 5,343,468 | | 8/1994 | Rau . |
| 5,430,709 | | 7/1995 | Galloway . |
| 5,442,637 | | 8/1995 | Nguyen . |
| 5,481,544 | | 1/1996 | Baldwin et al. . |
| 5,495,484 | * | 2/1996 | Self et al. . |

FOREIGN PATENT DOCUMENTS

| | | |
|---|---|---|
| 4218053 | of 0000 | (DE) . |
| 0510290 | 10/1992 | (EP) . |
| 2277852 | 11/1994 | (GB) . |
| WO 93/09623 | 5/1993 | (WO) . |

OTHER PUBLICATIONS

Helgert, "Integrated Services Digital Networks," Addison-–Wesley Publishing Company, pp. 52–55, 88–91, 1991.*

Kondo, et al., "Variable Rate Embedded ADPCM Coding Scheme for Packet Speech on ATM Networks", IEEE Global Telecommunications, San Diego, Dec. 2, 1990, pp. 523–527.

Chao, "Design of Transmission and Multiplexing Systems for Broadband Packet Networks", IEEE Journal on Selected Areas of Communications, vol. 6, No. 9, (Dec., 1988).

Taylor, ATM Reaches Back to the Analog World:, Data Communications, vol. 24, No. 14 (Oct., 1995).

PCT Search Report, Oct. 13, 1997, File No. PCT SE 97/00365.

Department of Computer Science, Washington University, St. Louis, MO 63130; *Measuring the Performance of Communication Middleware on High–Speed Networks*; by A.GokhaleD.Schmidt; SIGCOMM Conference, ACM 1996, Stanford University, Aug. 28–30, 1996; pp. 1–13.

* cited by examiner

*Primary Examiner*—Huy D. Vu
(74) *Attorney, Agent, or Firm*—Jenkens & Gilchrist, P.C.

(57) ABSTRACT

A scalable multi-level data bit stream is presented which is capable of supporting variable bandwidth ATM network access, including multiple rates for plural bearer channels of voice communications and increased rates for video and data (file transfer) communications. To support communications system repairability, the bit stream includes an embedded operation channel for connection maintenance, performance monitoring, path tracing and testing. Furthermore, the bit stream includes framing data for performing add/drop multiplexing to control bandwidth use by identifying added and dropped bearer channels communicated within the bit stream. The interface with the ATM network is provided through an ATM adaptation layer that segments the bit stream into ATM cells and also assembles the bit from received ATM cells. Both wireless and wireline communications systems are supported with use of the bit stream to access the ATM network.

54 Claims, 13 Drawing Sheets

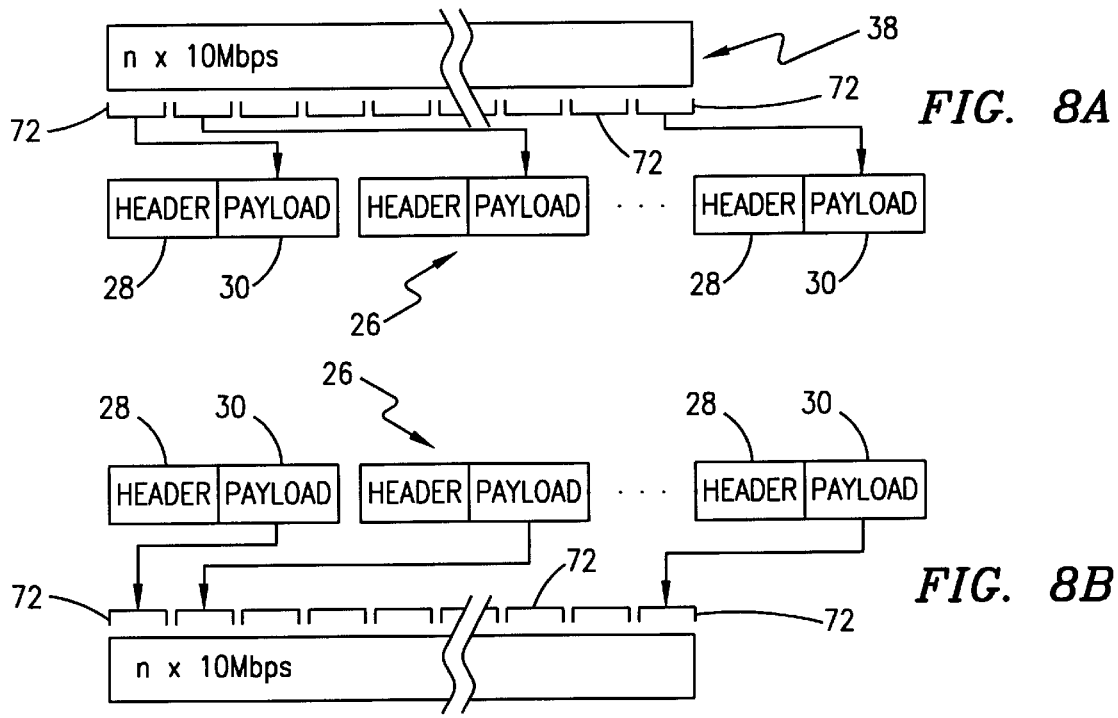
FIG. 8A
FIG. 8B
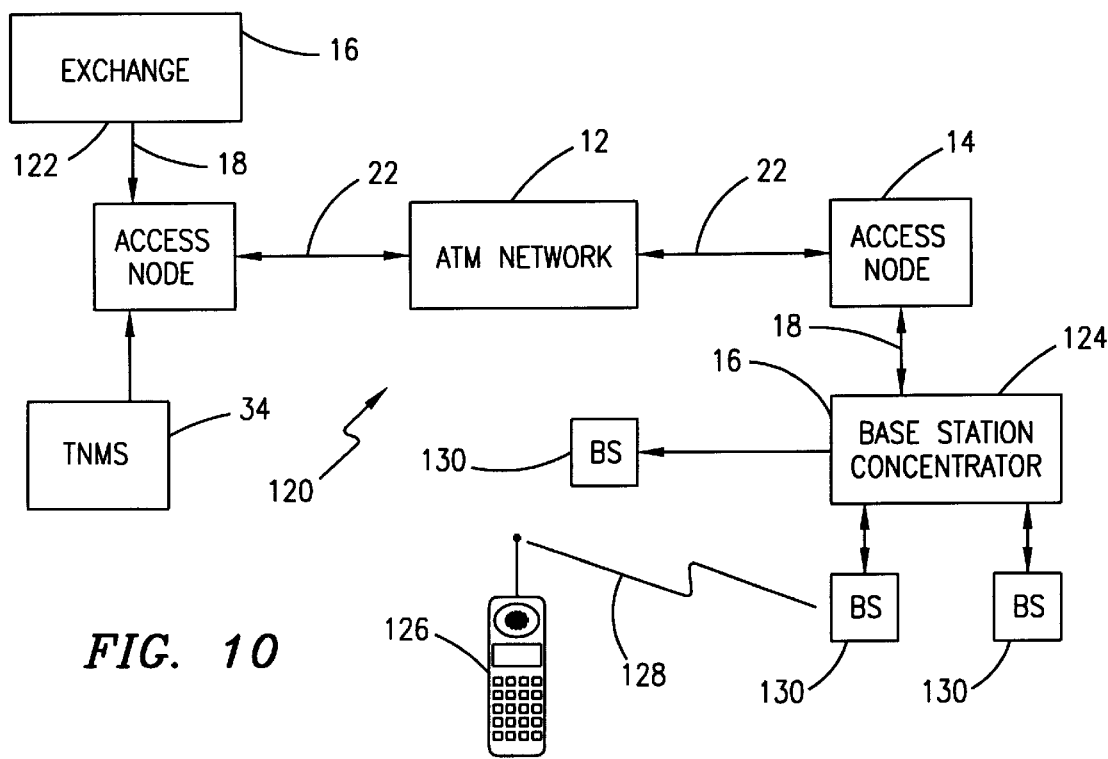
FIG. 10

SYSTEM SUPPORTING VARIABLE BANDWIDTH ASYNCHRONOUS TRANSFER MODE NETWORK ACCESS FOR WIRELINE AND WIRELESS COMMUNICATIONS

BACKGROUND OF THE INVENTION

1. Technical Field of the Invention

The present invention relates to asynchronous transfer mode (ATM) networks and, in particular, to variable bandwidth access to an ATM network for wireline and wireless communications.

2. Description of Related Art

Broadband transmission and switching have become important topics in the communications industry. A new system has been implemented for transmitting broadband and narrowband packet and circuit signals over a broadband network. This system is commonly referred to as asynchronous transfer mode (ATM). In ATM, data is packed into frames, with each frame segmented into a plurality of fixed length blocks called "cells." Each ATM cell is fifty-three bytes (or octets) long and consists of a five byte header indicating, as one of its functions, the destination of the cell, followed by a forty-eight byte payload containing the data to be transmitted to that destination.

The use of ATM cells permits the information transfer rate over the physical medium of the broadband network to adapt to actual service requirements. Depending on the capacity required, the number of cells per unit of time may be increased in a variable bit rate (VBR) ATM network up to the transmission bit rate limit of the physical medium. Alternatively, constant bit rates (CBR) are supported, with the transmission bit rate adjusted by the inclusion of idle or fill in cells when necessary. The cells are transported over the physical medium at a typical constant bit rate of, for example, 155.52 Mbits per second. Faster bit rates are supported for communications occurring solely within the ATM network.

One important characteristic of ATM technology relates to its protocol architecture and is built around the so-called "core-and-edge" principle. The protocol functions specific to the information type being transported, such as retransmissions, flow control, and delay equalization, are performed in user terminals at the "edges" of the ATM network. This leaves an efficient, service-independent "core" network, including only simple cell-transport and switching functions. A user-to-network interface (UNI) implementing an ATM adaptation layer (AAL) is provided at the "edge" of the network to connect the user terminals to the core network thereby allowing for service-independent ATM transport. The ATM adaptation layer performs a mapping operation between the bit stream data format of the user terminals external to the ATM network and the payload field of an ATM cell transmitted through the network.

A number of different bit stream data formats are known and used external to the ATM network. Most of these formats are user specific in that they support and accommodate only the data in the format and rate transmitted to or from user terminals. For example, in the telecommunications art, separate bit stream data formats are known for packet voice and pulse code modulated (PCM) signals. Furthermore, high quality video and data (file transfer) applications have still further different bit stream data formats. There would be a distinct advantage to having a single bit stream format capable of supporting variable bandwidth ATM network access with respect to a plurality of different user terminals and their associated data formats. Such a bit stream would preferably be flexible enough to convey packet and PCM voice, data and/or packet video, and further provide built-in capabilities for operation and maintenance and add/drop multiplexing.

SUMMARY OF THE INVENTION

The present invention comprises a communications system using a multi-level data bit stream capable of supporting variable bandwidth ATM network access. The bit stream is dynamic in nature in that it is capable of supporting a number of different sub-rates with respect to its included channel bearers. To support repairability and configurability, the bit stream includes an embedded operation channel used for transmitting operation and maintenance messages. Furthermore, to specify the use of the right amount of bandwidth at the proper location within the communications system, the bit stream includes delimiting data for performing add/drop multiplexing.

In particular, the multi-level data bit stream comprises a basic bit stream block including an appropriate repetition rate for the information being transmitted. The transmission bit rate of the basic bit stream block is a fraction of the transmission bit rate limit of the physical medium used in the ATM network. In instances where higher transmission bit rates are needed, for example in carrying video or data (file transfers), multiple basic bit stream blocks are used to carry the data during the same time period. The basic bit stream block further supports sub-rates useful in carrying voice and data communications in a plurality of channels. With respect to such sub-rate communications, delimiting data is added for performing add/drop multiplexing of the included channels. Furthermore, each basic bit stream block includes an embedded operation channel useful for connection maintenance, performance monitoring, path tracing, supervision and service management functions.

The multi-level data bit stream is used to carry information outside of the ATM network, but is compatible therewith to provide for network access. The present invention accordingly further comprises an interface with the ATM network that is provided through an ATM adaptation layer (AAL) within an ATM access node having a user-to-network interface (UNI) located at the "edge" of the network. The user-to-network interface segments the multi-level data bit stream into forty-six byte parts, plus two bytes for handling AAL #1 functionality, for insertion into the forty-eight byte payload portion of a plurality of ATM cells. Any destination information for the multi-level data bit stream is formatted within the five byte header portion of each of the ATM cells. On the other side of the ATM network, at the location identified by the translated destination information located within the header portion, the forty-six byte information segments in the ATM payload portion are extracted from the received ATM cells and reassembled to construct the multi-level data bit stream for delivery to the intended destination node.

The present invention further comprises a wireless communications system wherein a base station concentrator is connected through an access node to a ATM network. The concentrator is further connected to a plurality of base stations which effectuate radio frequency communications with a plurality of mobile stations using a plurality of voice channels. Communications over the link connecting the base station concentrator to the access node utilize the foregoing multi-level data bit stream. By means of the embedded operation channel, a transport network management system may perform connection maintenance, performance monitoring, path tracing and testing over the ATM network and with respect to the access node and base station concentrator. The included delimiting bits are used to control the add/drop multiplexing of the wireless communications voice channels.

The present invention still further comprises a wireline communications system wherein a wireline concentrator is connected through an access node to a ATM network. The concentrator is further connected to a plurality of wireline telephone terminals through which subscribers engage in telephone communications using a plurality of voice channels. Communications over the link connecting the wireline concentrator to the access node utilize the foregoing multi-level data bit stream. By means of the embedded operation channel, a transport network management system may perform connection maintenance, performance monitoring, path tracing and testing over the ATM network and with respect to the access node and wireline concentrator. The included delimiting bits are used to control the add/drop multiplexing of the wireline communications voice channels.

With respect to either or a combination of both wireless and wireline communications systems, a communications exchange is connected through an access node to the ATM network. The transport network management system is also connected through an access node to the ATM network. Communications over the link connecting the exchange to the access node utilize the foregoing multi-level data bit stream. By means of the embedded operation channel, a transport network management system may perform connection maintenance, performance monitoring, path tracing and testing over the ATM network and with respect to the access node and the exchange. The included delimiting bits are used to control the add/drop multiplexing of wireline and wireless communications voice channels.

BRIEF DESCRIPTION OF THE DRAWINGS

A more complete understanding of the method and apparatus of the present invention may be acquired by reference to the following Detailed Description when taken in conjunction with the accompanying Drawings wherein:

FIGS. 8A and 8B illustrate ATM adaptation layer #1 conversion between ATM cells and n×10 Mbps bit stream basic blocks at the segmentation and reassembly stages, respectively;

FIG. 10 is a block diagram of a portion of a cellular telecommunications system utilizing the communications system of FIG. 1;

DETAILED DESCRIPTION OF THE DRAWINGS

Figure 1:
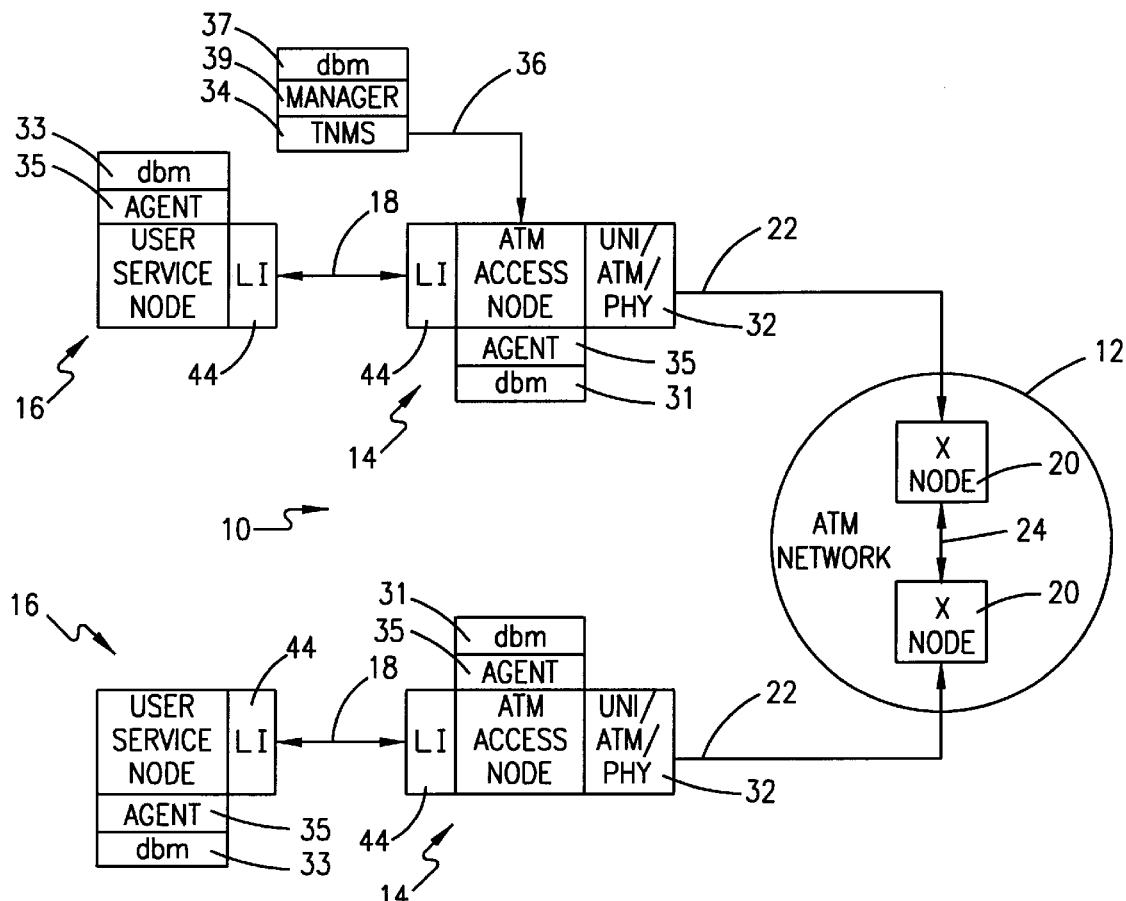
FIG. 1 is a block diagram of a communications system utilizing an asynchronous transfer mode (ATM) transport network.

Reference is now made to FIG. 1 wherein there is shown a block diagram of a communications system 10 utilizing an asynchronous transfer mode (ATM) transport network 12. The system 10 includes a plurality of ATM access nodes 14 and user (service) nodes 16 external to the ATM transport network 12. The ATM access nodes 14 perform pre-shaping flow enforcement functions and are located at the "edges" of the ATM transport network 12 between the user nodes 16 and the ATM transport network "core". At such a location, the access nodes 14 implement protocol functions specific to the information being transported over the network (like flow control and delay equalization). The access nodes 14 and the user service nodes 16 are connected by communications links 18 supporting the transmission of an ATM access compatible, multi-level data bit stream as will be described.

The core of the ATM network 12 comprises a plurality (only two shown) of interconnected ATM cross-connect (switching) nodes 20 that perform only simple ATM transport and switching functions. The cross-connect nodes 20 are connected to the ATM access nodes 14 by communications links 22, and are interconnected with each other by communications links 24. The links 22 and 24 support the transmission of basic information units (cells) through the ATM network 12 at a bit rate in accordance with well known ATM standards and protocols. This "core and edge" principle for building an ATM network 12 makes it relatively simple to introduce new services as the specific service dependent functions are handled external to the ATM network in the ATM access nodes 14, with the ATM network itself solely being responsible for routing and transporting service data.

Figure 2:
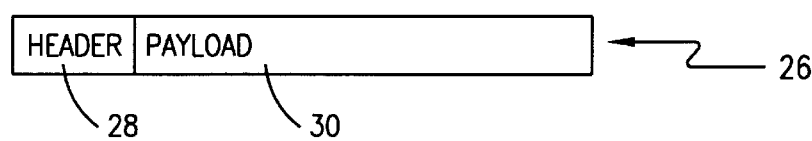
FIG. 2 illustrates the configuration of an ATM cell.

With reference now to FIG. 2, the basic information transfer unit within the ATM network 12 is a small, fixed size packet commonly referred to as an ATM cell 26. The fixed length of the ATM cell 26 is fifty-three bytes (or octets) divided into a five octet header field 28 and a forty-eight octet information (payload) field 30. The header field 28 contains, among other things, information identifying the ATM cell 26 and specifying the routing of the cell through the ATM network 12. The routing information comprises a virtual path identifier (VPI) and a virtual channel identifier (VCI). A virtual path comprises a bundle of multiplexed circuits between two termination points at each ATM node and is identified by the virtual path identifier in the ATM cell header field 28. The virtual path concept allows multiple virtual channels through the ATM network 12 to be handled as a single unit. The virtual channel is identified by the virtual channel identifier in the ATM cell header field 28.

The payload field 30 of the ATM cell 26 typically carries user data. In addition to the ATM cells 26 which carry user data, other cells having the same fixed size are defined for use in the ATM network 12 for signaling and maintenance. The signaling cells are used to set up a service, for example, comprising a connection through or outside of the ATM network 12. The maintenance cells are used to supervise the virtual paths and virtual channels through the ATM network 12. Idle cells, also having the same fixed size, may be used to fill the transmission capacity of the ATM network 12 up to the transmission bit rate limit of the physical medium.

Reference is now again made to FIG. 1. Data received over communications links 18 by the ATM access nodes 14 at the edge of the ATM network 12 must be converted to the ATM cell 26 fixed size format of FIG. 2. This is accomplished by a user-to-network interface (UNI) 32. The user-to-network interface 32 implements an ATM adaptation layer (AAL) which performs mapping between the format of the data carried over the communications links 18 and the information field 30 of the ATM cell 26. Some examples of the functions provided by the ATM adaptation layer are convergence, segmentation and reassembly, variable length packet delineation, sequence numbering, clock recovery and performance monitoring. The ATM adaptation layer is an important part of the user-to-network interface 32 because adaptation between the data on link 18 for the user service external to the ATM network 12 and the ATM cell 26 on link 22 to allow for service independent ATM data transport. Thus, the interface 32 further functions to make the connection to the physical media of the communications link 22. The identifier "UNI/ATM/PHY" for the interface 32 accordingly refers to the UNI operation of converting to and from the ATM cell format (ATM) and inserting and extracting cells with respect to the physical medium (PHY) of the ATM network.

The communications system 10 further includes a transport network management system (TNMS) 34 to process and provide operation and maintenance (O&M) information regarding the communications system 10 in general, as well as the ATM network 12 in particular. It will be noted that the transport network management system 34 is connected to only a single ATM access node 14 via a communications link 36. This is because through that single ATM access node 14 and the ATM network 12 the transport network management system 34 has access for communications to each of the access nodes 14, user service nodes 16 and ATM operation and maintenance of the switching nodes 20.

The communications system 10 implements an agent/manager concept with respect to the operation and maintenance functionality. Operation and maintenance messages (data, information relating, for example, to performance management, fault management, security management and configuration management) concerning the access nodes 14 themselves and the ATM transport network 12 (and its cross-connect nodes 20) are stored in a local data base memory (dbm) 31 associated with each access node. Similarly, operation and maintenance messages concerning the user nodes 16 themselves are stored in an associated local data base memory (dbm) 33. Management of the data stored within the data base memories 31 and 33 for the access nodes 14 and user nodes 16, respectively, is performed by an agent functionality 35. The transport network management system 34 includes a global data base memory (dbm) 37 for storing operation and maintenance messages relating to the communications system 10 as a whole. Management of this data is performed by a manager functionality 39. Responsive to requests from the manager functionality 39, the agent functionalities 35 retrieve operation and maintenance data from the data base memories 31 and 33 for forwarding and storage in the global data base memory 37. Alternatively or additionally, and further on a periodic basis or in response to a change in status, the agent functionality 35 retrieves operation and maintenance data from the data base memories 31 or 33, and refreshes the data stored in the global data base memory 37.

Figure 3:
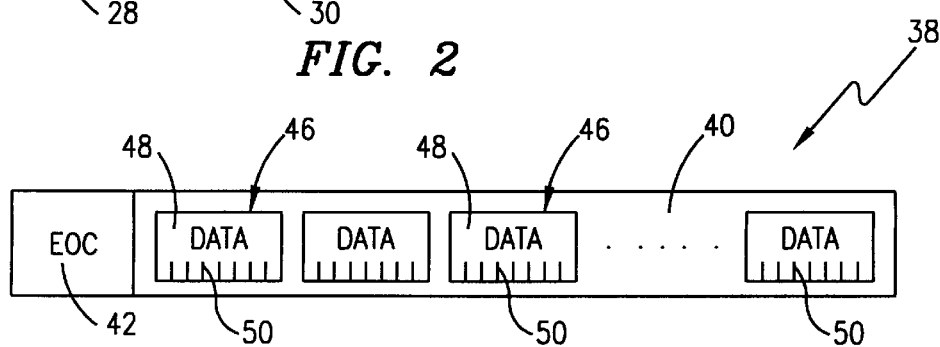
FIG. 3 illustrates a multi-level data bit stream basic block.

Reference is now made to FIG. 3 wherein there is shown a multi-level data bit stream basic block 38 which is transmitted over the communications links 18 between the access nodes 14 and the user service nodes 16. The bit stream basic block 38 includes a data portion 40 wherein service data relating to the user nodes 16 is carried. The bit stream basic block 38 further includes an embedded operation channel (EOC) 42 which contains the operation and maintenance data for the transport network management system 34. It is through use of this embedded operation channel 42 that the transport network management system 34 can have access to each of the nodes of the communications system 10 while only being connected to a single access node 14 and offer all of the functionality currently described under TMN Standard M.3010. An operation and maintenance flag within the embedded operation and maintenance channel 42 further helps in system 10 determination of the beginning of another bit stream basic block 38.

With reference now again to FIG. 1, the ATM access node 14 inserts and extracts information to and from the embedded operation channel 42 of the bit stream basic block 38. The extracted information from the embedded operation channel 42 comprises information received from transmissions either over the ATM network 12 or from the connected to user service node(s) 16 or access nodes 14 for processing by the transport network management system 34. The inserted information into the embedded operation channel 42 comprises information received from the transport network management system 34 to be transmitted either over the ATM network 12 or to the connected to user service node(s) 16 or access nodes 14.

In response to bit stream basic blocks 38 received over communications link 18, the ATM access node 14 further functions in accordance with its ATM adaptation layer to segment the data portion 40 and embedded operation channel 42 into segments of an appropriate byte length to fit within the payload portion 30 of one or more ATM cells 26 (see, FIG. 2). The ATM access node 14 further determines the destination for the received bit stream basic blocks 38 and processes routing table derived addressing information in the header portion 28 of the ATM cells 26 which include the segmented data. The generated ATM cells 26 are then output from the ATM access node 14 over communications link 22 in accordance with any specified flow restrictions for transmission over the ATM network 12 to the destination translated by each ATM node according to a given routing algorithm.

An opposite procedure is followed with respect to ATM cells 26 received from the ATM network 12 over communications link 22. The ATM access node 14 identifies from the header 28 of the received ATM cell 26 and a destination routing table the particular user service node 16 to which the data in the payload portion of that ATM cell is intended for delivery. From the payloads 30 of the received ATM cells 26, the ATM access node 14 uses the ATM adaptation layer to construct the bit stream basic block(s) 38 needed to convey the information. The bit stream basic block(s) 38 are then transmitted to the appropriate identified destination user service node 16 via communications link 18.

The user service nodes 16 may not be located physically close to the ATM access node 14. To account for this, both the user service node 16 and the ATM access node 14 include a line interface 44 that facilitates bit stream basic block data transmission over certain types of communications links 18 within communications systems better suited for last mile communications. Such communications systems include asymmetric digital subscriber line (ADSL); hybrid fiber coaxial (HFC); fiber optic transport system (FOTS); fiber in the loop (FITL); or a scalable (e.g., seven times) T1 connection.

Reference is now again made to FIG. 3. The bit stream basic block supports transmission at a plurality of rates, and thus may be configured to include a plurality of sub-blocks 46. Each sub-block 46 is at the appropriate repetition rate for the data being transmitted over a plurality of channels. Thus, each sub-block 46 includes a data portion 48 for communicating the plural channel communications data. The sub-blocks 46 still further include uniformly spread delimiting bits 50 (indicated by tick marks within the data portions 48) for assisting in the performance of add/drop multiplexing with respect to the plural transmitted channels. The delimiting bits 50 identify particular ones of the plural channels which may be added or dropped from the data stream in order to use these particular channels at the given local user service nodes 16. Because the delimiting bits 50 comprise a portion of the bit stream basic block 38, that information may be transmitted from one user service node 16 or ATM access node 14 across the ATM network 12 for implementation at another user service node.

The configuration of the bit stream basic block to include both an embedded operation channel 42 and delimiting bits 50 for supporting add/drop multiplexing may be better understood with reference to a specific example. Assume for this example a bit stream basic block transmitted at a rate of 10 Mbps (megabits per second). The rate of 10 Mbps for the bit stream basic block is chosen in this example because it is equivalent to seven T1 connections, and thus the selected bit rate for this example is sufficient to be at least an equivalent in cost to one DS3. The bit stream basic block is scalable to handle various types of communications traffic. In the event a transmission rate greater than 10 Mbps is needed to carry the communications, for example, with respect to a high quality video or data (file transfer) communications, additional 10 Mbit basic blocks are added to the bit stream (for the same time period) to increase the overall rate of transmission over the communications links 18 (FIG. 1) to n×10 Mbps over the same ATM connection. It will, of course, be understood that the n ×10 Mbps bit stream may not be scaled by n to a rate faster than the transmission bit rate limit of the physical medium (communications links 22 and 24) of the ATM network 12.

Each 10 Mbit basic block further supports a number of sub-rates used to transmit voice communications. Voice must be transmitted at a certain repetition rate in order to control call delays and offer the proper level of granularity. For packet voice and personal communications systems (PCS) type of communications, the delay between consecutive voice packets is twenty milliseconds which gives a repetition rate of fifty packets per second. For pulse code modulated (PCM) type of voice communications, on the other hand, the repetition rate is 8,000. The bit stream basic block supports both packet voice and pulse code modulated voice communications while also providing the delimiting bits to control the adding or dropping of individual voice channels. The foregoing further supports the provision of bit stuffing to control cell delay variations.

Figure 4:
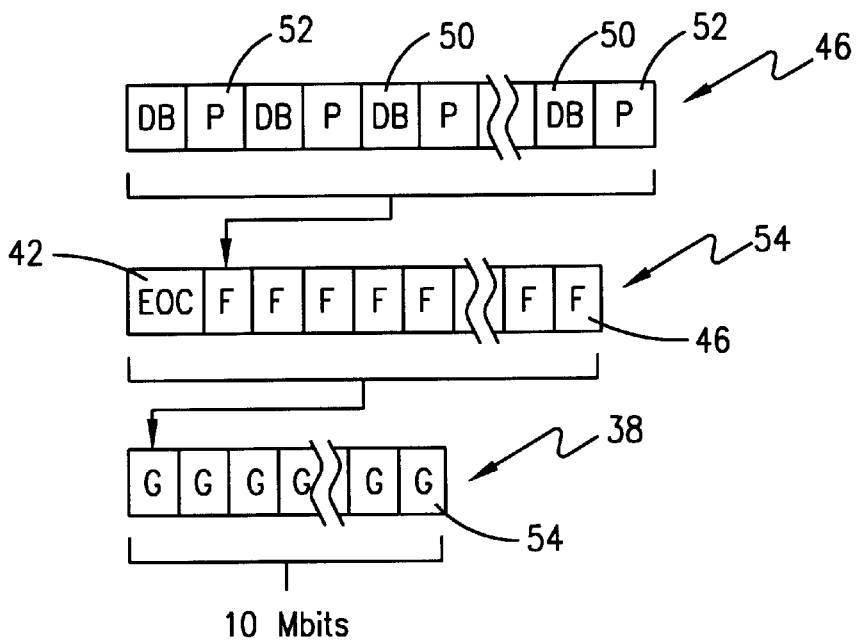
FIG. 4 illustrates the construction of the basic block of FIG. 3 to handle sub-rate plural bearer channels for packet voice communications.

Reference is now made to FIG. 4 wherein there is illustrated the construction of an example bit stream basic block 38 according to FIG. 3 to handle sub-rate plural bearer channel packet voice communications. The individual packets (P) 52 for a packet voice PCS type communications system comprise one hundred ninety-two bits each. One frame (F) 46 of packet voice communications comprises at least forty packets 52 (bearer channels) of one hundred ninety-two bits each plus three hundred twenty evenly spread add/drop multiplexing delimiting bits (DB) 50 for a total of 8 Kbits. Twenty-four of the frames 46 are then assembled together along with an 8 Kbit embedded operation channel 42 to form a group (G) 54 having a total of 200 Kbits. With the packet voice (PCS) repetition rate of fifty groups 54 per second, this gives the 10 Mbps bit stream basic block 38 (FIG. 3) having both an embedded operation channel 42 and delimiting bits 50 for performing add/drop multiplexing functions. Thus, with respect to packet voice, each 10 Mbps bit stream basic block may be used to transmit nine-hundred sixty packet voice channels (40×24=960).

Figure 5:
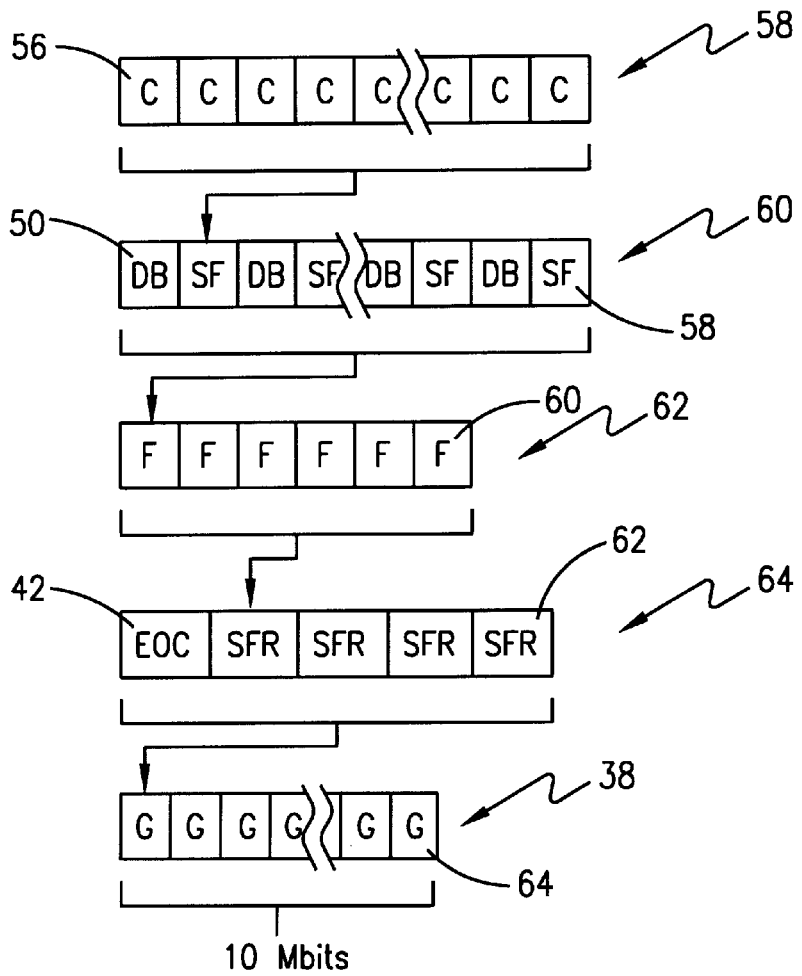
FIG. 5 illustrates the construction of the basic block of FIG. 3 to handle full rate plural bearer channels for pulse code modulated (PCM) voice communications.

Reference is now made to FIG. 5 wherein there is illustrated the construction of an example bit stream basic block 38 according to FIG. 3 to handle full rate plural bearer channel pulse code modulated (PCM) voice communications. In accordance with known T1 North American practice, there are twenty-four channels (C) 56 of eight bits each in each PCM sub-frame (SF) 58. Thus, each PCM sub-frame 58 comprises one hundred ninety-two bits. One frame (F) 60 of PCM voice communications comprises forty sub-frames 58 of one hundred ninety-two bits each plus three hundred twenty evenly distributed delimiting bits (DB) 50 for a total of 8 Kbits. In this example, there are six PCM frames 60 (i.e., blocks of 8 Kbits each) in each super frame (SFR) 62, and four super frames 62 plus an 8 Kbit embedded operation channel 42 are included in forming a group (G) 64 having a total of 200 Kbits. It should be noted that within a group 64 the four super frames 62 contain identical (i.e., repeated) PCM channels. Repeated then at a rate of fifty groups 64 per second, this gives the 10 Mbps bit stream basic block 38 (FIG. 3) having both an embedded operation channel 42 and delimiting bits 50 for performing add/drop multiplexing. Thus, with respect to PCM voice, each 10 Mbps bit stream basic block may be used to transmit one-hundred forty-four channels (24×6=144). PCM voice communications have a repetition rate of 8,000 per each eight bit channel 56 to give 64 Kbps channel bearers. This rate is derived with respect to the 10 Mbps bit stream basic block 38 shown in FIG. 5 from the forty sub-frames 58, the four super frames 62, and the fifty groups 64 per second repetition rate (40×4×50=8,000).

The bit stream basic block 38 is flexible in application and can simultaneously support both packet voice and PCM voice communications. For example, the bit stream basic block may be configured to support a combination of 160 packet voice channels and 120 PCM voice channels, or 320 packet voice channels and 96 PCM voice channels, or 480 packet voice channels and 72 PCM voice channels. Thus, in a telephone network utilizing the bit stream basic block 38 transmitted over communications links 18 and accessing an ATM transport network 12, either or both packet voice and/or PCM voice is supported. Furthermore, it will be understood that such a communications network may further transmit broadband information (like high quality video or data transfers) using the flexibility of the n×10 Mbps bit stream basic block 38.

Figure 6:
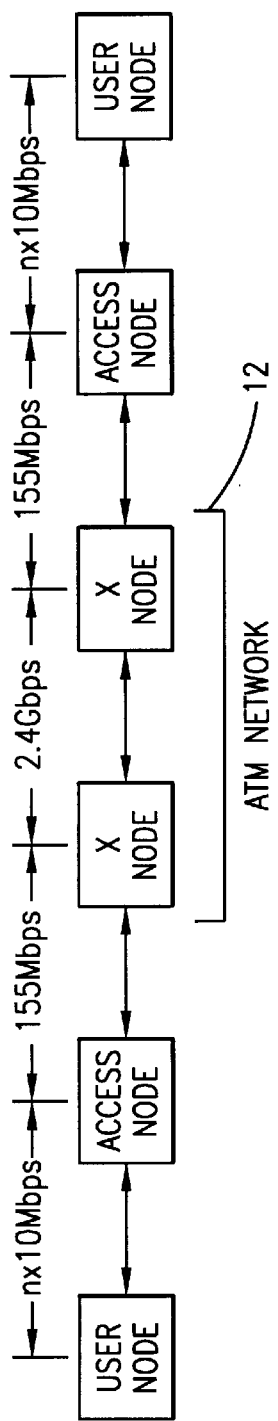
FIG. 6 is a communications line diagram illustrating by way of example the connections and associated transmission bit rates for a given communication handled by the communications system of FIG. 1.

Reference is now made to FIG. 6 wherein there is shown a communications line diagram illustrating the connections and an example of associated transmission bit rates for a given communication handled by the communications system of FIG. 1. Communications between the access nodes 14 and the user nodes 16 are transmitted at a rate of n×10 Mbps using the 10 Mbps bit stream basic block shown in FIG. 3. The 10 Mbps bit stream basic block supports data/video transmissions as well as plural sub-rates for multi-channel (e.g., packet or PCM) voice communications, delimiting bits for controlling channel add/drop multiplexing by the user nodes 16, and an embedded operation channel for monitoring and controlling communications system operation and maintenance. Communications between the access nodes 14 and the switching nodes 20 of the ATM network 12 occur at a conventional ATM bit rate of, for example, 155 Mbps using the ATM cells 26 (FIG. 2). The communications links 24 between the switching nodes 20 of the ATM network 12 also utilize the ATM cells 26 for transmitting information, but the rate may be much higher than over the links 22 at, for example, 2.4 Gbps (gigabits per second).

Figure 7:
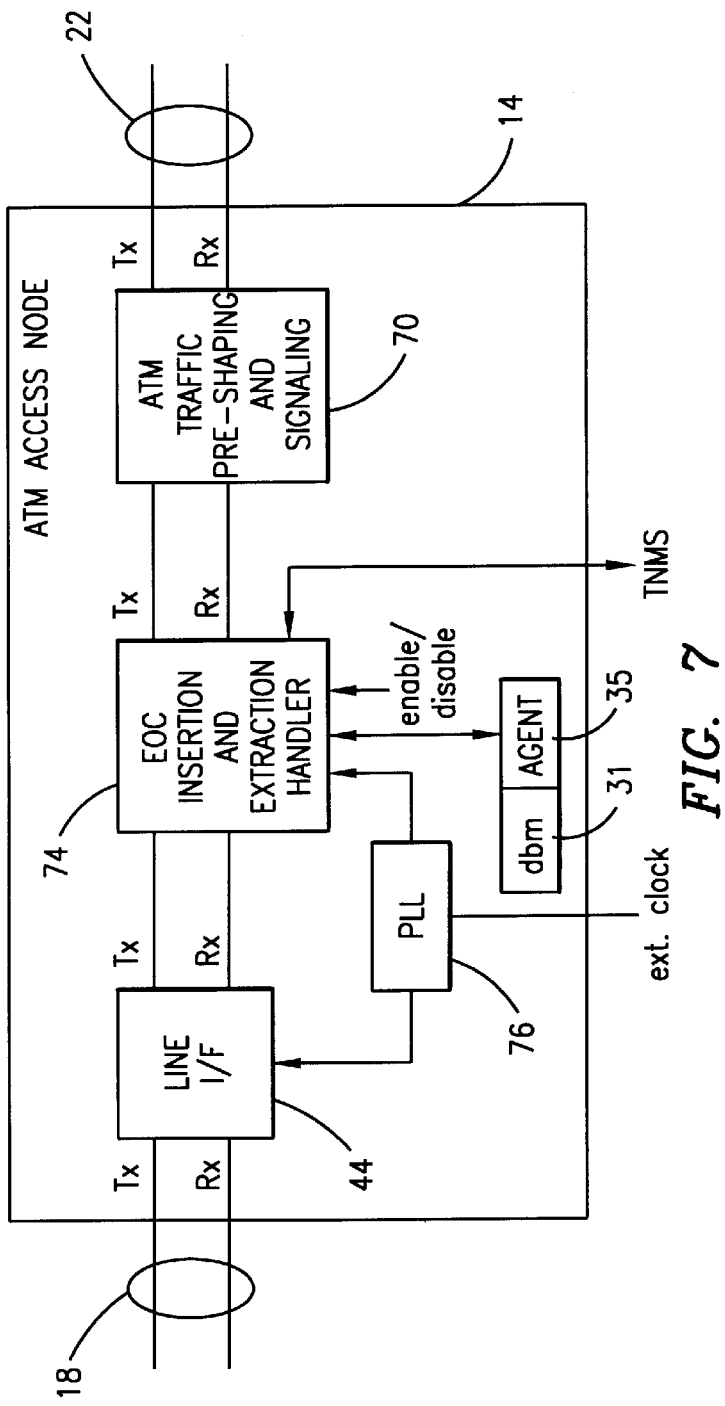
FIG. 7 is a block diagram of an ATM access node supporting multi-level data bit stream basic block transmissions with an embedded operation channel and an ATM pre-shaping signaling functionality.

Reference is now made to FIG. 7 wherein there is shown a block diagram of the ATM access node 14 (FIG. 1) supporting multi-level data bit stream basic block transmissions with framing bits for add/drop multiplexing and an embedded operation channel. The access node 14 comprises an ATM traffic pre-shaping and signaling functionality 70 implementing an ATM adaptation layer (AAL), and in particular AAL #1, for converting between the n×10 Mbps bit stream basic blocks and the ATM cells. As illustrated in FIG. 8A, this ATM adaptation layer conversion with respect to the n×10 Mbps bit stream basic blocks 38 involves the segmentation of the basic block into forty-seven or forty-six byte parts 72 for insertion into the payload portions 30 of a plurality of ATM cells 26 for transmission over the communications link 22. Any destination information for the n×10 Mbps bit stream basic blocks 38 (as well as other accompanying information) is formatted into five byte parts for insertion into the header portion 28 of each of the ATM cells 26. The ATM adaptation layer conversion with respect to the ATM cells 26 received over communications link 22 is illustrated in FIG. 8B involves extraction of the forty-seven or forty-six byte segments from the ATM payload portion 30 to make parts 72 used in constructing the n×10 Mbps bit stream basic blocks 38.

The access node 14 further comprises an EOC insertion and extraction handler 74 connected to the ATM traffic pre-shaping and signaling functionality 70 for receiving and sending EOC information between the access node and the transport network management system 34. The n×10 Mbps bit stream basic block 38 construction operation further includes the insertion of the information received from the transport network management system (TNMS) 34 over communications link 36 into the embedded operation channel (EOC) 42. The access node 14 further extracts the embedded operation channel 42 information from received n×10 Mbps bit stream basic blocks 38 and transmits that extracted information to the transport network management system 34 for processing. It should be noted that in those instances where the access node 14 is not connected to a transport network management system 34, the EOC insertion and extraction handler 74 exhibits a disable physical connection to the transport network management system 34 (via an enable/disable input selection). To facilitate the transmission and storage of operation and maintenance data, the EOC insertion and extraction handler 74 is connected to a local data base memory 31 through an agent functionality 35.

As discussed previously, the access node also includes a line interface 44 to handle n×10 Mbps bit stream basic block 38 transmissions over communications link 18 with, for example, a non-proximately located user service node 16. The line interface 44 facilitates bit stream basic block data transmission over certain types of communications links 18 within communications systems better suited for last mile communications such as asymmetric digital subscriber line (ADSL), hybrid fiber coaxial (HFC); fiber optic transport system (FOTS); fiber in the loop (FITL); or a scalable (e.g., seven times) T1 connection. The line interface is also used to synchronize the bit stream basic block 38 to the rest of the network either from a derived or an external source. Timing for controlling the operation of the EOC handler 74 and line interface 44 is provided by a phase lock loop 76 derived from the incoming transmission link 18 or from an external clock signal.

Figure 9:
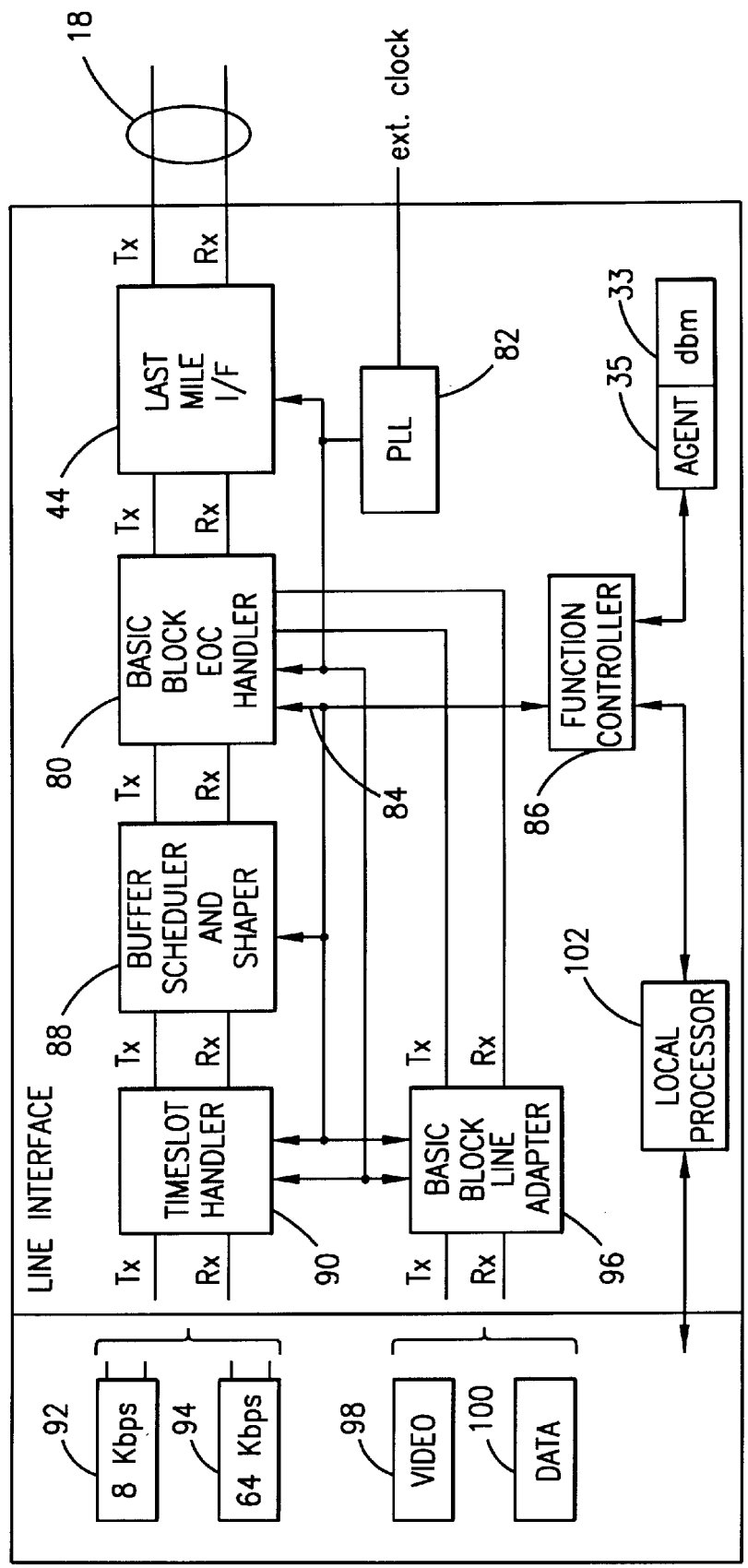
FIG. 9 is a block diagram of an interface portion of a user node supporting multi-level data bit stream basic block transmissions with delimiting bits for add/drop multiplexing.

Reference is now made to FIG. 9 wherein there is shown a block diagram of a portion of the user node 16 including a last mile line interface 44 for connecting with the communications link 18 to facilitate bit stream basic block data transmission over last mile communications such as asymmetric digital subscriber line (ADSL), hybrid fiber coaxial (HFC); fiber optic transport system (FOTS); fiber in the loop (FITL); or a scalable (e.g., seven times) T1 connection. The interface 44 utilizes a digital signal processing technique in handling the bit stream basic blocks. Connected to the interface 44 is a basic block EOC handler 80. Bit stream basic blocks are passed between the interface 44 and handler 80 based on a clock signal output from a phase lock loop 82. The handler 80 further extracts the embedded operation channel from the bit stream basic block, and transmits the extracted information over signal bus 84 to a function controller 86 for the interface 44.

The handler 80 is connected to a buffer scheduler and shaper functionality 88 used to improve cell delay variations relating to accessing of the ATM network. The functionality 88 is connected to timeslot handler 90 capable of making both full rate and sub-rate transmission/reception connections to the user node 16. For voice communications, such connections may be made to eight kilohertz MUX cards (8 Kbps) 92 comprising the user nodes 16 and supporting packet voice communications, or to sixty-four kilohertz MUX cards (64 Kbps) 94 comprising the user nodes and supporting PCM voice communications. With respect to user nodes which support plural channels (like the 8 Kbps cards 92), the delimiting bits within the bit stream basic block facilitate add/drop multiplexing and variable bandwidth control. The basic block EOC handler 80 is further connected to a basic block line adapter 96 capable of making both broadband transmission/reception connections to the user node 16 for video 98 or data (file transfer) 100.

In addition to receiving embedded operation channel information from the basic block EOC handler 80 over signal bus 84, the function controller further uses the signal bus, and its connections to the functionality 88, timeslot handler 90 and line adapter 96, to indicate whether subrate (8 Kbps), full rate (64 Kbps) or basic block rate (10 Mbps) traffic is being carried in accordance with the traffic service requirements specified by the transport network management system 34 (FIG. 1). The function controller 86 is further connected to a local processor 102 which is in communication with the user node 16 and issues control commands to the function controller regarding the specified traffic and directing the operation of the function controller in managing operation of the interface 44. To facilitate the transmission and storage of operation and maintenance data, the function controller 86 is connected to a local data base memory 33 through an agent functionality 35.

Referring now to FIG. 10, there is shown a block diagram of a portion of a cellular telecommunications system 120 utilizing the communications system 10 of FIG. 1. The user service node 16 on one side of the system 10 comprises the telephone exchange (mobile switching center) 122 for the cellular communications system 120. On the other side of the system 10, the user nodes 16 comprise at least one base station concentrator 124 connected to base stations 130 through which mobile stations 126 engage in radio communications over a plurality of voice channels 128. Communications between the exchange 122 and the access node 14, and between the base station concentrator 124 and the access nodes, occur over links 18 using the previously described bit stream basic blocks in a multi-level bit stream communication. With the use of ATM adaptation layer segmentation and reassembly in the access nodes 14, the multi-level bit stream communication, including its embedded operation channel and add/drop multiplexing delimiting bits, is transmitted across the ATM network 12 using ATM cells. Using the embedded operation channel, the transport network management system 34 performs connection maintenance, performance monitoring, path tracing and testing over the ATM network 12 and with respect to the access nodes 14 and the user nodes 16 comprising the exchange 122, the base station concentrator 124 and base stations 130. Furthermore, using the included delimiting bits and instructions contained within the embedded operation channel, the base station concentrator 124 performs add/drop multiplexing with respect to the voice channels 128 through which mobile station 126 communications are effectuated.

Reference is now made to FIGS. 11–16 wherein there are shown graphs generated from a simulation of message traffic transmitted over a communications system like that shown in FIG. 1. For purposes of the simulation, the transmission bit rate limit of the communications links 22 and 24 is 155 Mbps. Within the ATM transport network 12 it is assumed that there are six digital cross-connect switching nodes 20.

Figure 11:
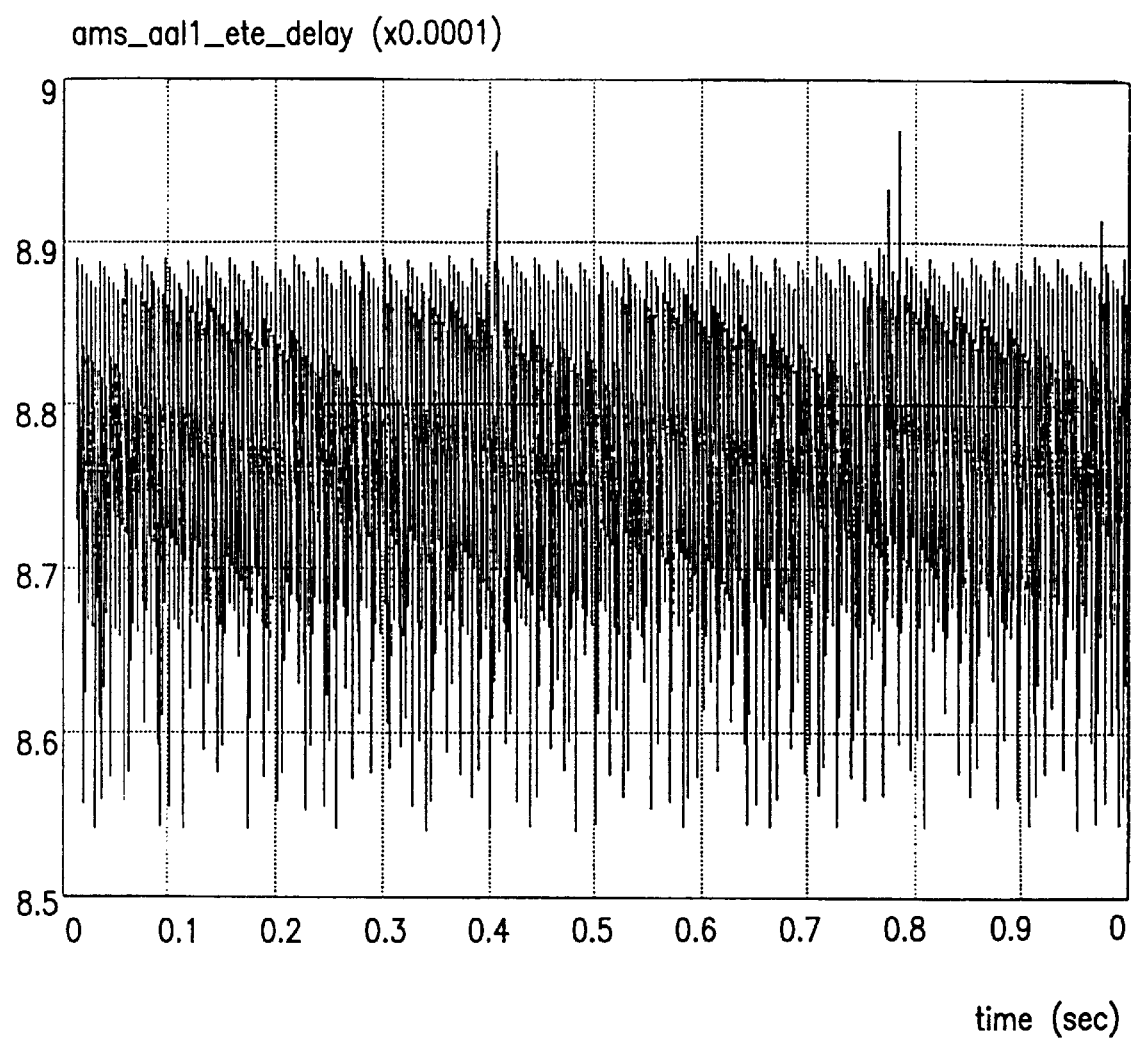
FIGS. 11, 13 and 15 are graphs of the end-to-end delay of message transmissions using a number of different sized bit stream basic blocks as simulated over a communications system like that illustrated in FIG. 1.
Figure 13:
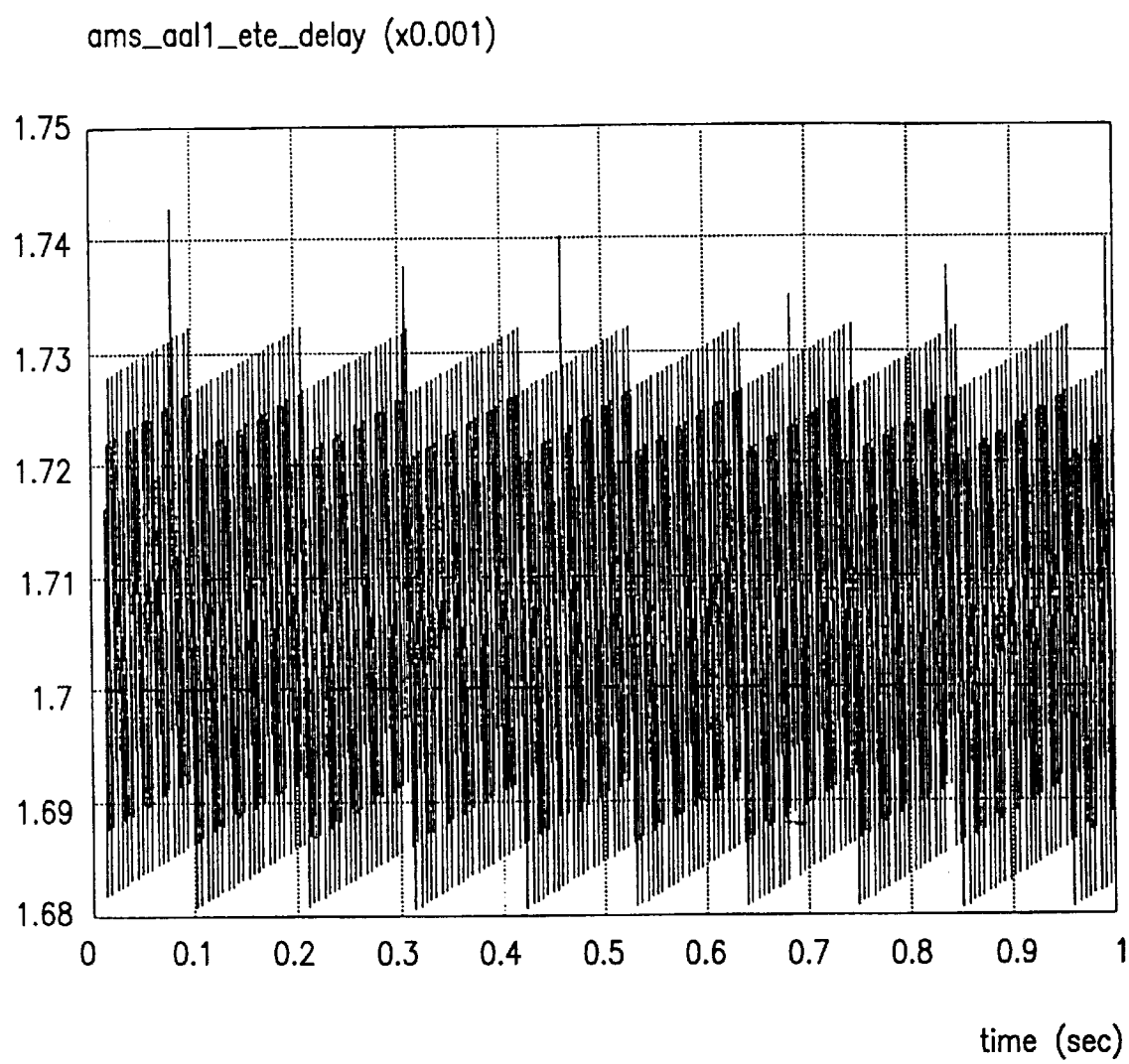
Figure 15:
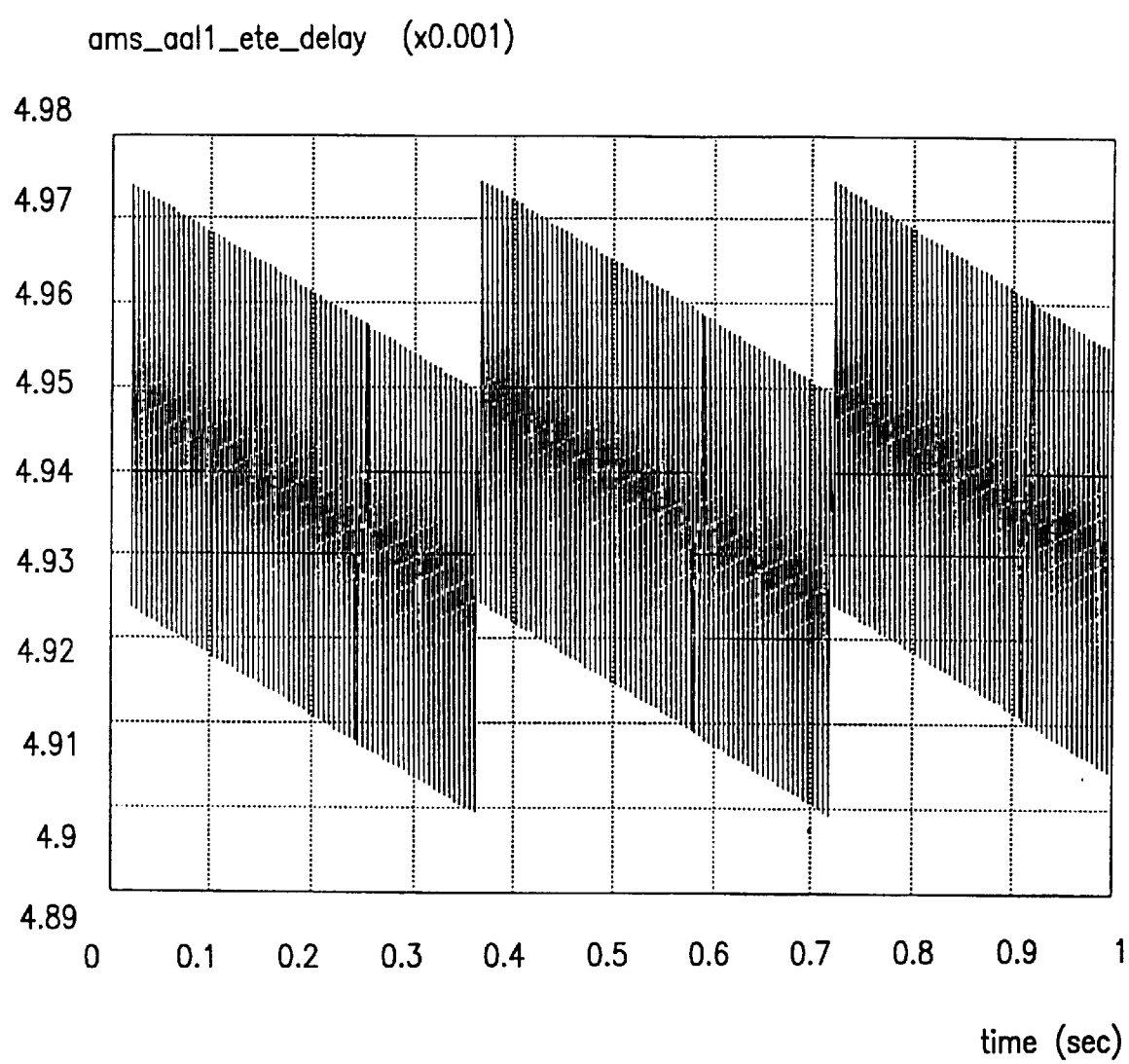

With specific reference now to FIGS. 11, 13 and 15, the y-axis measures the end-to-end transmission delay (in seconds as indicated) of messages sent between user nodes 16 on opposite sides of the ATM transport network 12. The x-axis measures the time duration (in seconds) of the simulation. In FIG. 11, a 10 Mbps bit stream basic block is used for message transmission over the communications links 18. In FIG. 13, a 5 Mbps bit stream basic block is used for message transmission over the communications links 18. Finally, in FIG. 15, a 1.667 Mbps bit stream basic block is used for message transmission over the communications links 18. In each case it will be noted that the end-to-end delay for message transmission remains relatively short in spite of the fact that the bit stream basic block is one-half the exemplary 10 Mbps size in the FIG. 13 simulation, and one-sixth the exemplary size in the FIG. 15 simulation.

Figure 12:
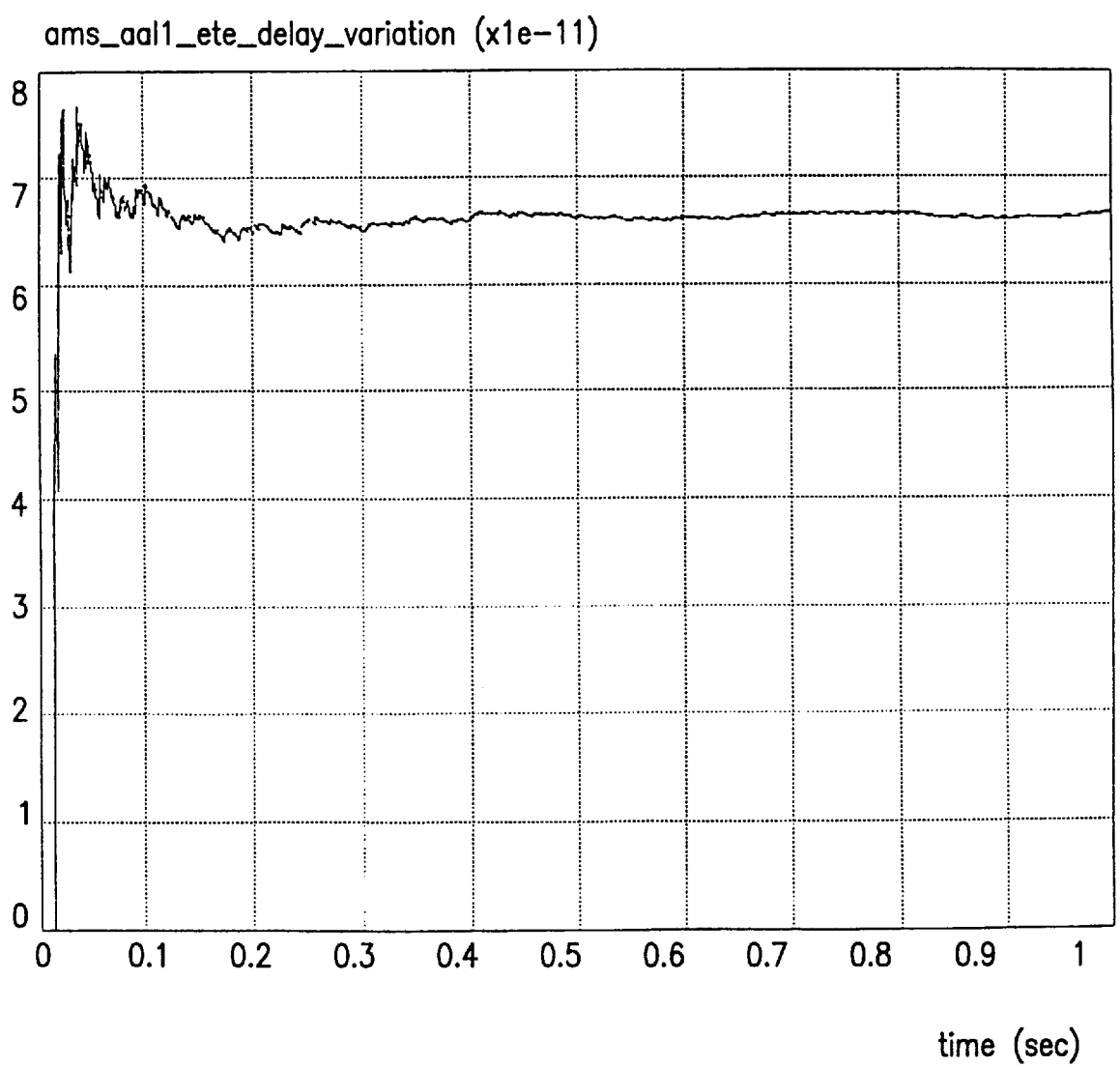
FIGS. 12, 14 and 16 are graphs of the end-to-end delay variation of the simulated message transmissions having the delays of FIGS. 11, 13 and 15.
Figure 14:
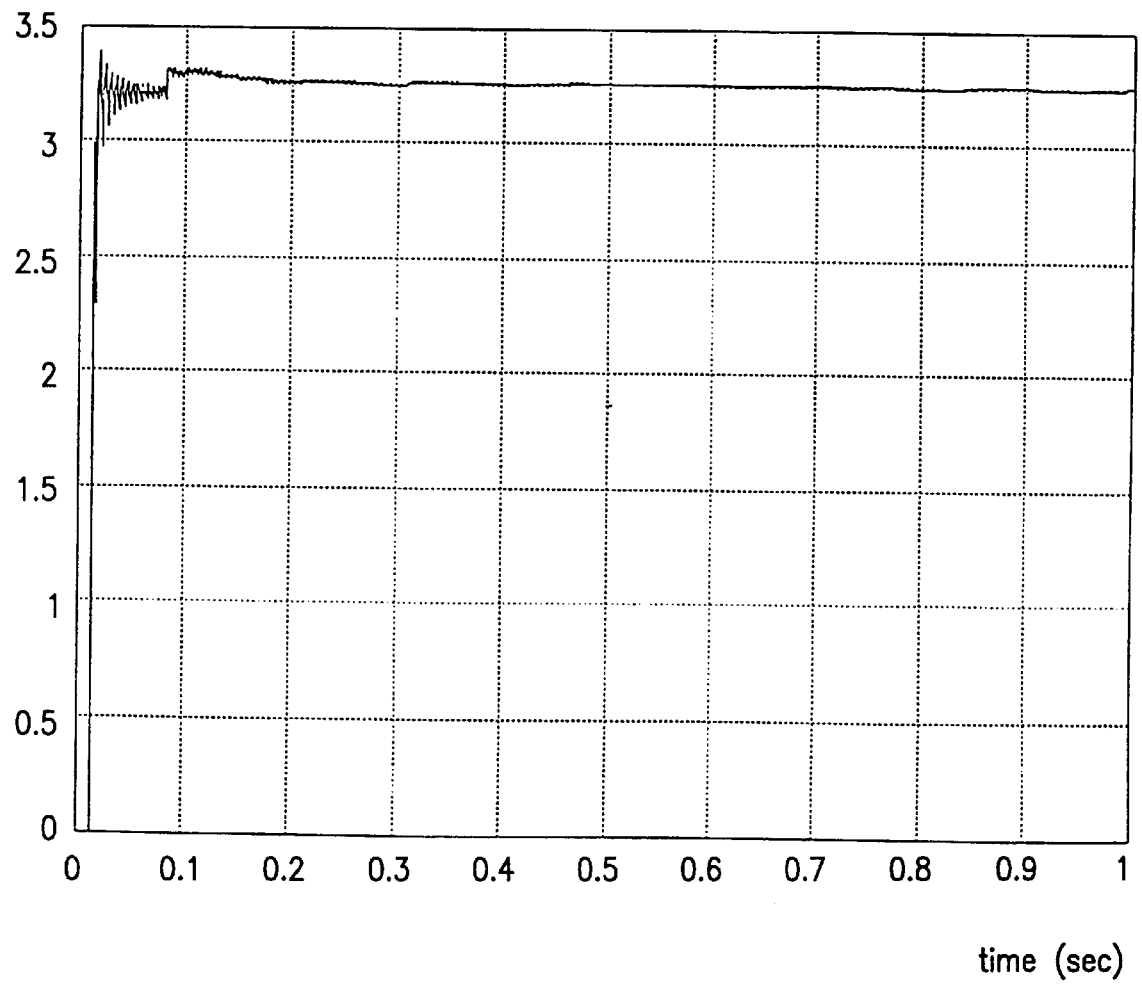
Figure 16:
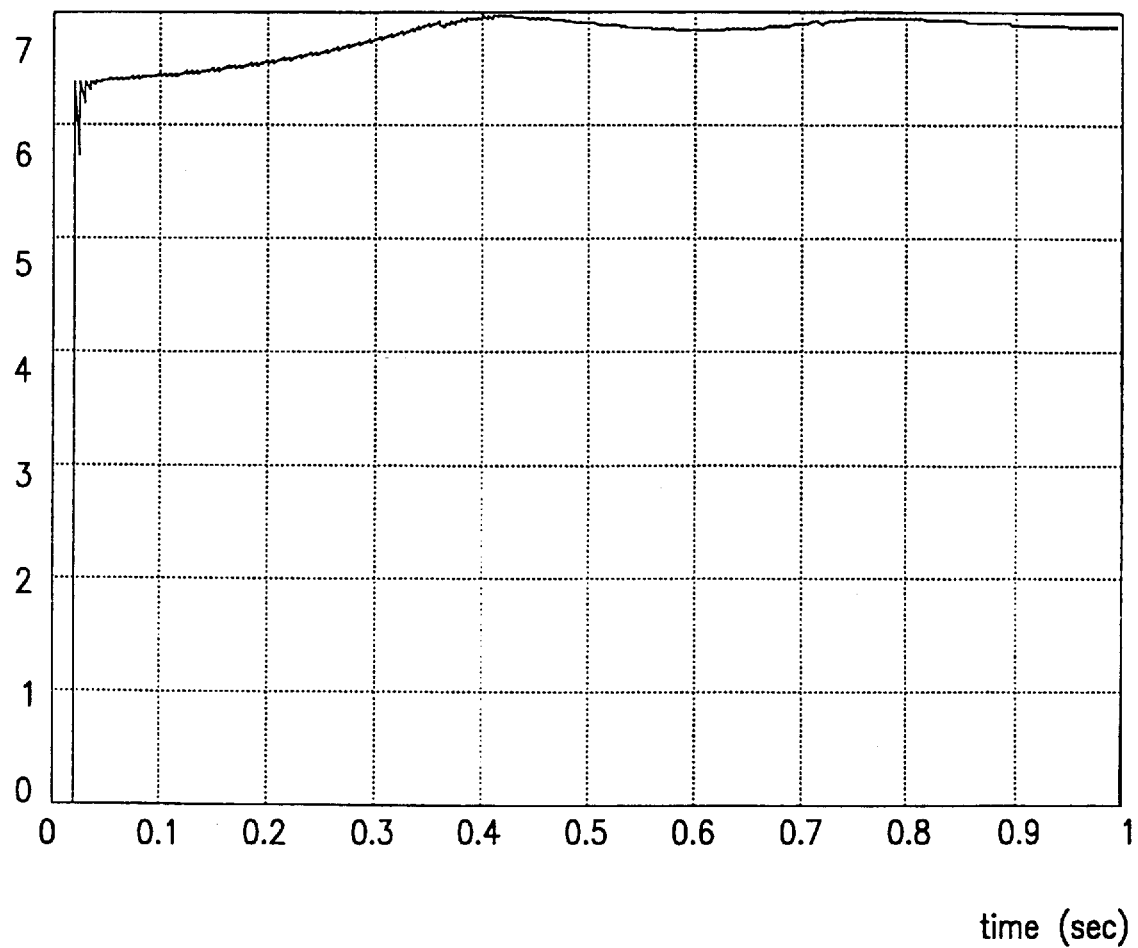

Reference is now specifically made to FIGS. 12, 14 and 16 wherein the y-axis measures the variation in end-to-end delay of messages sent between user nodes 16 on opposite sides of the ATM transport network 12. The x-axis measures the time duration (in seconds) of the simulation. Corresponding to FIGS. 11, 13 and 15, FIGS. 12, 14 and 16 refer to a 10 Mbps bit stream basic block simulation, a 5 Mbps bit stream basic block simulation, and a 1.667 Mbps bit stream basic block simulation, respectively. In each case it will be noted that the variation in end-to-end delay for message transmission remains relatively small in spite of the fact that the bit stream basic block is one-half the exemplary 10 Mbps size in the FIG. 14 simulation, and one-sixth the exemplary size in the FIG. 16 simulation.

The FIGS. 11–16 for the simulations performed with a 10 Mbps bit stream basic block simulation, a 5 Mbps bit stream basic block simulation, and a 1.667 Mbps bit stream basic block illustrate that the size chosen for the bit stream basic block is relatively unimportant to performance, and further that performance of the communications system 10 is not adversely affected if smaller sized bit stream basic blocks are chosen for use over the communications links 18.

Figure 17:
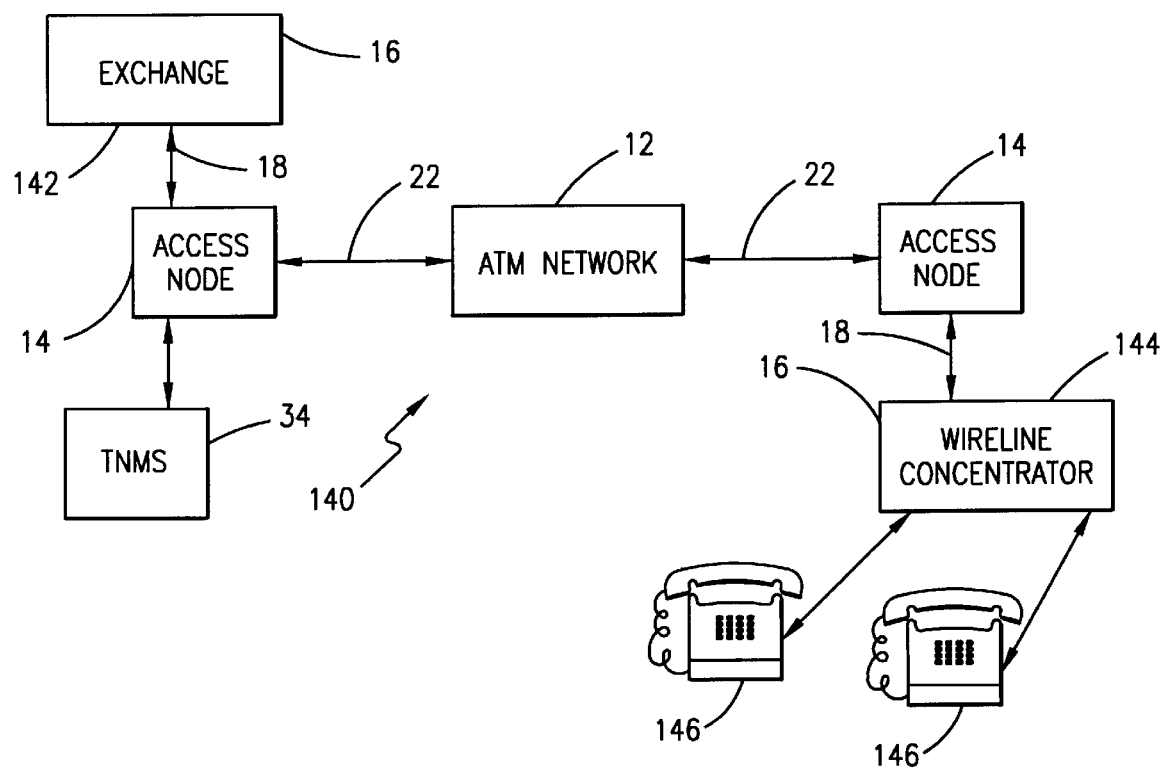
FIG. 17 is a block diagram of a portion of a wireline telecommunications system utilizing the communications system of FIG. 1.

Referring now to FIG. 17, there is shown a block diagram of a portion of a wireline telecommunications system 140 utilizing the communications system 10 of FIG. 1. The user service node 16 on one side of the system 10 comprises the telephone exchange 142 for the wireline communications system 140. On the other side of the system 10, the user nodes 16 comprise at least one wireline concentrator 144 connected to a plurality of wireline telephone terminals 146 through which subscribers engage in telephone communications using a plurality of voice channels. Communications between the exchange 142 and the access node 14, and between the wireline concentrator 144 and the access nodes, occur over links 18 using the previously described bit stream basic blocks in a multi-level bit stream communication. With the use of ATM adaptation layer segmentation and reassembly in the access nodes 14, the multi-level bit stream communication, including its embedded operation channel and add/drop multiplexing delimiting bits, is transmitted across the ATM network 12 using ATM cells. Using the embedded operation channel, the transport network management system 34 performs connection maintenance, performance monitoring, path tracing and testing over the ATM network 12 and with respect to the access nodes 14 and the user nodes 16 comprising the exchange 142 and the wireline concentrator 144. Furthermore, using the included delimiting bits and instructions contained within the embedded operation channel, the wireline concentrator 144 performs add/drop multiplexing with respect to the voice channels through which subscriber wireline telephone terminal 146 communications are effectuated.

Figure 18:
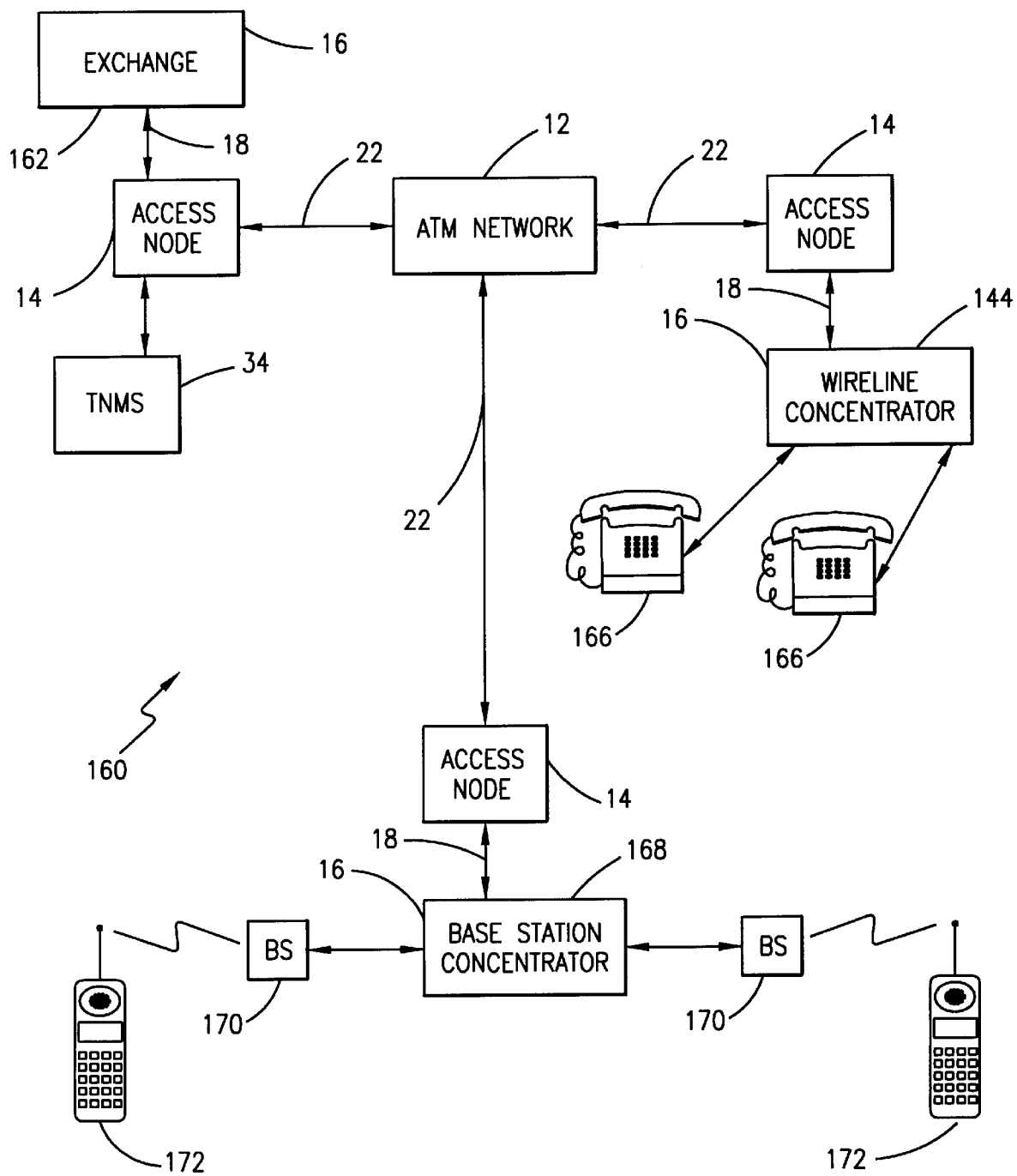
FIG. 18 is a block diagram of a portion of a combination cellular/wireline telecommunications system utilizing the communications system of FIG. 1.

Referring now to FIG. 18, there is shown a block diagram of a portion of a combination wireless/wireline telecommunications system 160 utilizing the communications system 10 of FIG. 1. The user service node 16 on one side of the system 10 comprises the telephone exchange 162 for the combination communications system 160. On the other side of the system 10, the user nodes 16 comprise at least one wireline concentrator 164 connected to a plurality of wireline telephone terminals 166 through which subscribers engage in telephone communications using a first plurality of voice channels. The user nodes 16 on the other side of the system further comprise at least one base station concentrator 168 connected to base stations 170 through which mobile stations 172 engage in radio communications over a second plurality of voice channels. Communications between the exchange 162 and the access node 14, and between the wireline concentrator 164 and its access node, and between the base station concentrator 168 and its access node, occur over communications links 18 using the previously described bit stream basic blocks in a multi-level bit stream communication. With the use of ATM adaptation layer segmentation and reassembly in the access nodes 14, the multi-level bit stream communication, including its embedded operation channel and add/drop multiplexing delimiting bits, is transmitted across the ATM network 12 using ATM cells. Using the embedded operation channel, the transport network management system 34 performs connection maintenance, performance monitoring, path tracing and testing over the ATM network 12 and with respect to the access nodes 14 and the user nodes 16 comprising the exchange 162, the wireline concentrator 164 and the base station concentrator 168. Furthermore, using the included delimiting bits and instructions contained within the embedded operation channel, the wireline concentrator 144 performs add/drop multiplexing with respect to the first plurality of voice channels through which subscriber wireline telephone terminal 146 communications are effectuated, while the base station concentrator 168 performs add/drop multiplexing with respect to the second plurality of voice channels through which mobile station 172 communications are effectuated.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A cellular telephone communications system accessing an asynchronous transfer mode (ATM) transport network, comprising:
   a plurality of base stations effectuating radio frequency communications with subscriber mobile stations over a plurality of voice channels;
   a base station concentrator connected to the plurality of base stations;
   at least one first access node connected to the ATM transport network; and
   a communications link connecting the base station concentrator and the at least one first access node;
   a transport network management system connected to a certain access node of the ATM transport network;
   wherein the base station concentrator and each first access node include an interface for communicating voice information over the communications link using a communications bit stream that includes delimiting bits for specifying at the base station concentrator add/drop multiplexing of the plurality of voice channels;
   wherein the communications bit stream further includes an embedded operation channel carrying system operation and maintenance information for delivery to and from the transport network management system; and
   wherein the at least one first access node includes means for converting between the communications bit stream carried over the communications link and ATM cells carried over the ATM transport network.

2. The system of claim 1 wherein the certain access node includes a handler functionality connected to the transport network management system for inserting and extracting system operation and maintenance information into and from the embedded operation channel of the communications bit stream.

3. The system of claim 1 wherein the communications bit stream has a format comprising a bit stream basic block including an appropriate repetition rate for the voice information being transmitted over the communication link.

4. The system of claim 3 wherein the delimiting bits for add/drop multiplexing are substantially evenly dispersed throughout the bit stream basic block.

5. The system of claim 1 wherein the interface of the base station concentrator includes functionality for controlling base station use of the plurality of channels through add/drop multiplexing in view of the delimiting bits contained within the communications bit stream.

6. The system of claim 1 wherein the means for converting of the at least one first access node comprises:
   means for segmenting the communications bit stream for insertion into a payload portion of transmitted ATM cells; and
   means for assembling payload portions of received ATM cells into the communications bit stream.

7. The system of claim 1 further comprising:
   a telephone exchange;
   at least one second access node connected to the ATM transport network; and
   a second communications link connecting the telephone exchange and the at least one second access node;
   wherein the telephone exchange and each access node include an interface for communicating voice information over the second communications link using the communications bit stream including delimiting bits specifying add/drop multiplexing of the plurality of voice channels; and
   wherein the at least one second access node includes means for converting between the communications bit stream carried over the second communications link and ATM cells carried over the ATM transport network.

8. The system of claim 7 wherein the means for converting of the at least one second access node comprises:
   means for segmenting the communications bit stream for insertion into a payload portion of transmitted ATM cells; and
   means for assembling payload portions of received ATM cells into the communications bit stream.

9. The system of claim 7 wherein the access node includes a handler functionality connected to the transport network management system for inserting and extracting system operation and maintenance information into and from the embedded operation channel of the communications bit stream.

10. The system of claim 7 wherein the communications bit stream has a format comprising a bit stream basic block including an appropriate repetition rate for the voice information being transmitted over the second communication link.

11. The system of claim 10 wherein the delimiting bits for add/drop multiplexing are substantially evenly dispersed throughout the bit stream basic block.

12. A telephone communications system accessing an asynchronous transfer mode (ATM) transport network, comprising:
   a telephone exchange;
   at least one first access node connected to the ATM transport network;
   a transport network management system connected to a certain access node of the ATM transport network; and
   a communications link connecting the telephone exchange and the at least one first access node;
   wherein the telephone exchange and each first access node include an interface for communicating voice information over the communications link using a communications bit stream that includes delimiting bits for specifying add/drop multiplexing of a plurality of telecommunications voice channels;
   wherein the communications bit stream further includes an embedded operation channel carrying system operation and maintenance information for delivery to and from the transport network management system; and wherein the at least one first access node includes means for converting between the communications bit stream carried over the communications link and ATM cells carried over the ATM transport network.

13. The system of claim 12 wherein the certain access node includes a handler functionality connected to the transport network management system for inserting and extracting system operation and maintenance information into and from the embedded operation channel of the communications bit stream.

14. The system of claim 12 wherein the communications bit stream has a format comprising a bit stream basic block including an appropriate repetition rate for the voice information being transmitted over the communication link.

15. The system of claim 14 wherein the delimiting bits for add/drop multiplexing are substantially evenly dispersed throughout the bit stream basic block.

16. The system of claim 12 wherein the means for converting of the first access node comprises:
- means for segmenting the communications bit stream for insertion into a payload portion of transmitted ATM cells; and
- means for assembling payload portions of received ATM cells into the communications bit stream.

17. The system of claim 12 further comprising:
- a plurality of base stations effectuating radio frequency communications with subscriber mobile stations over a plurality of voice channels;
- a base station concentrator connected to the plurality of base stations;
- at least one second access node connected to the ATM transport network; and
- a second communications link connecting the base station concentrator and the at least one second access node;
- wherein the base station concentrator and each second access node include an interface for communicating voice information over the second communications link using the communications bit stream including delimiting bits specifying at the base station concentrator add/drop multiplexing of the plurality of voice channels; and
- wherein the second access node includes means for converting between the communications bit stream carried over the second communications link and ATM cells carried over the ATM transport network.

18. The system of claim 17 wherein the interface of the base station concentrator includes functionality for controlling base station use of the plurality of channels through add/drop multiplexing in view of the delimiting bits contained within the communications bit stream.

19. The system of claim 17 wherein the means for converting of the at least one second access node comprises:
- means for segmenting the communications bit stream for insertion into a payload portion of transmitted ATM cells; and
- means for assembling payload portions of received ATM cells into the communications bit stream.

20. The system of claim 12 further comprising:
- a plurality of wireline telephone terminals communicating over a plurality of voice channels;
- a concentrator connected to the plurality of wireline telephone terminals;
- at least one second access node connected to the ATM transport network; and
- a second communications link connecting the concentrator and the at least one second access node;
- wherein the concentrator and each second access node include an interface for communicating voice information over the second communications link using the communications bit stream including delimiting bits specifying at the concentrator add/drop multiplexing of the plurality of voice channels; and
- wherein the second access node includes means for converting between the communications bit stream carried over the second communications link and ATM cells carried over the ATM transport network.

21. The system of claim 20 wherein the interface of the concentrator includes functionality for controlling wireline telephone terminal use of the plurality of channels through add/drop multiplexing in view of the delimiting bits contained within the communications bit stream.

22. The system of claim 20 wherein the means for converting of the at least one second access node comprises:
- means for segmenting the communications bit stream for insertion into a payload portion of transmitted ATM cells; and
- means for assembling payload portions of received ATM cells into the communications bit stream.

23. A telephone communications system accessing an asynchronous transfer mode (ATM) transport network, comprising:
- a plurality of wireline telephone terminals communicating over a plurality of voice channels;
- a concentrator connected to the plurality of wireline telephone terminals;
- at least one first access node connected to the ATM transport network;
- a transport network management system connected to a certain access node of the ATM transport network; and
- a communications link connecting the concentrator and the at least one first access node;
- wherein the concentrator and each first access node include an interface for communicating voice information over the communications link using a communications bit stream that includes delimiting bits for specifying at the concentrator add/drop multiplexing of the plurality of voice channels;
- wherein the communications bit stream further includes an embedded operation channel carrying system operation and maintenance information for delivery to and from the transport network management system; and
- wherein the first access node includes means for converting between the communications bit stream carried over the communications link and ATM cells carried over the ATM transport network.

24. The system of claim 23 wherein the certain access node includes a handler functionality connected to the transport network management system for inserting and extracting system operation and maintenance information into and from the embedded operation channel of the communications bit stream.

25. The system of claim 23 wherein the communications bit stream has a format comprising a bit stream basic block including an appropriate repetition rate for the voice information being transmitted over the communication link.

26. The system of claim 25 wherein the delimiting bits for add/drop multiplexing are substantially evenly dispersed throughout the bit stream basic block.

27. The system of claim 23 wherein the interface of the concentrator includes functionality for controlling wireline telephone terminal use of the plurality of channels through add/drop multiplexing in view of the delimiting bits contained within the communications bit stream.

28. The system of claim 23 wherein the means for converting of the first access node comprises:
   means for segmenting the communications bit stream for insertion into a payload portion of transmitted ATM cells; and
   means for assembling payload portions of received ATM cells into the communications bit stream.

29. The system of claim 23 further comprising:
   a telephone exchange;
   at least one second access node connected to the ATM transport network; and
   a second communications link connecting the telephone exchange and the at least one second access node;
   wherein the telephone exchange and each second access node include an interface for communicating voice information over the second communications link using the communications bit stream including delimiting bits specifying add/drop multiplexing of the plurality of voice channels; and
   wherein the second access node includes means for converting between the communications bit stream carried over the second communications link and ATM cells carried over the ATM transport network.

30. The system of claim 29 wherein the means for converting of the second access node comprises:
   means for segmenting the communications bit stream for insertion into a payload portion of transmitted ATM cells; and
   means for assembling payload portions of received ATM cells into the communications bit stream.

31. The system of claim 29 wherein the certain access node includes a handler functionality connected to the transport network management system for inserting and extracting system operation and maintenance information into and from the embedded operation channel of the communications bit stream.

32. The system of claim 29 wherein the communications bit stream has a format comprising a bit stream basic block including an appropriate repetition rate for the voice information being transmitted over the second communication link.

33. The system of claim 31 wherein the delimiting bits for add/drop multiplexing are substantially evenly dispersed throughout the bit stream basic block.

34. An asynchronous transfer mode (ATM) communications system, comprising:
   an ATM transport network;
   a first node;
   a first communications link connecting the first node to the ATM transport network;
   a second node;
   a second communications link connecting the second node to the ATM transport network;
   a transport network management system connected to the first node; and
   wherein the first and second nodes comprise ATM access nodes and further include means for converting communications to ATM cells carried over the first and second communications links and the ATM transport network;
   wherein the bit stream basic block further includes an embedded operation channel carrying system operation and maintenance information for delivery to and from the transport network management system; and
   wherein the first node includes a handler functionality for inserting and extracting system operation and maintenance information into and from the embedded operation channel of the bit stream basic block.

35. The system of claim 34 wherein the means for converting of the first and second nodes comprises:
   means for segmenting the bit stream basic block for insertion into a payload portion of transmitted ATM cells; and
   means for assembling payload portions of received ATM cells into the bit stream basic block.

36. A telephone communications system accessing an asynchronous transfer mode (ATM) transport network, comprising:
   a telephone exchange;
   a first access node connected to the ATM transport network;
   a first communications link connecting the telephone exchange and the first access node;
   a plurality of base stations effectuating radio frequency communications with subscriber mobile stations over a first plurality of voice channels;
   a base station concentrator connected to the plurality of base stations;
   a second access node connected to the ATM transport network;
   a second communications link connecting the base station concentrator and the second access node;
   a plurality of wireline telephone terminals communicating over a second plurality of voice channels;
   a wireline concentrator connected to the plurality of wireline telephone terminals;
   a third access node connected to the ATM transport network;
   a third communications link connecting the wireline concentrator and the third access node;
   a transport network management system connected to either the first, second or third access node;
   wherein the telephone exchange, base station concentrator, wireline concentrator and the first, second and third access nodes each include an interface for communicating voice information over the first, second and third communications links using a communications bit stream that includes delimiting bits for specifying add/drop multiplexing of the first and second pluralities of voice channels;
   wherein the communications bit stream further includes an embedded operation channel carrying system operation and maintenance information for delivery to and from the transport network management system; and
   wherein the first, second and third access nodes include means for converting between the communications bit stream carried over the first, second and third communications links and ATM cells carried over the ATM transport network.

37. The system of claim 36 wherein the first, second or third access node to which the transport network management system is connected includes a handler functionality for inserting and extracting system operation and maintenance information into and from the embedded operation channel of the communications bit stream.

38. The system of claim 36 wherein the communications bit stream has a format comprising a bit stream basic block including an appropriate repetition rate for the voice information being transmitted between the exchange and the base station concentrator and wireline concentrator.

39. The system of claim 38 wherein the delimiting bits for add/drop multiplexing are substantially evenly dispersed throughout the bit stream basic block.

40. The system of claim 36 wherein the means for converting of the first, second and third access nodes comprises:
   means for segmenting the communications bit stream for insertion into a payload portion of transmitted ATM cells; and
   means for assembling payload portions of received ATM cells into the communications bit stream.

41. The system of claim 36 wherein the interface of the base station concentrator includes functionality for controlling base station use of the first plurality of channels through add/drop multiplexing in view of the delimiting bits contained within the communications bit stream.

42. The system of claim 36 wherein the interface of the wireline concentrator includes functionality for controlling wireline telephone terminal use of the second plurality of channels through add/drop multiplexing in view of the delimiting bits contained within the communications bit stream.

43. The system of claim 36 wherein the first plurality of voice channels comprise either or both pulse code modulated (PCM) voice channels or packet voice channels.

44. The system of claim 36 wherein the second plurality of voice channels comprise either or both pulse code modulated (PCM) voice channels or packet voice channels.

45. The system of claim 1 wherein the plurality of voice channels comprise pulse code modulated (PCM) communications channels, and the delimiting bits specify add/drop multiplexing with respect to age of those PCM communications channels.

46. The system of claim 1 wherein the plurality of voice channels comprise packet voice communications channels, and the delimiting bits specify add/drop multiplexing with respect to use of those packet voice communications channels.

47. The system of claim 12 wherein the plurality of telecommunications voice channels comprise pulse code modulated (PCM) communications channels, and the delimiting bits specify add/drop multiplexing with respect to use of those PCM communications channels.

48. The system of claim 12 wherein the plurality of telecommunications voice channels comprise packet voice communications channels, and the delimiting bits specify add/drop multiplexing with respect to use of those packet voice communications channels.

49. The system of claim 23 wherein the plurality of voice channels comprise pulse code modulated (PCM) communications channels, and the delimiting bits specify add/drop multiplexing with respect to use of those PCM communications channels.

50. The system of claim 23 wherein the plurality of voice channels comprise packet voice communications channels, and the delimiting bits specify add/drop multiplexing with respect to use of those packet voice communications channels.

51. The system of claim 36 wherein the plurality of voice channels comprise pulse code modulated (PCM) communications channels, and the delimiting bits specify add/drop multiplexing with respect to use of those PCM communications channels.

52. The system of claim 36 wherein the plurality of voice channels comprise packet voice communications channel, and the delimiting bits specify add/drop multiplexing with respect to use of those packet voice communications channels.

53. The system as in claim 34 further including third communications links connected to the first and second nodes, the third communications links communicating voice information using a bit stream basic block having an appropriate repetition rate for the voice information.

54. The system of claim 34 wherein the voice communications comprise a plurality of voice channels, and wherein the bit stream basic block includes delimiting bits for specifying add/drop multiplexing of the voice channels.

* * * * *

UNITED STATES PATENT AND TRADEMARK OFFICE
CERTIFICATE OF CORRECTION

PATENT NO. : 6,205,143 B1
DATED : March 20, 2001
INVENTOR(S) : Yves Lemieux

It is certified that error appears in the above-identified patent and that said Letters Patent is hereby corrected as shown below:

<u>Column 19,</u>
Line 35, replace "age" with -- use --

<u>Column 20,</u>
Line 27, replace "channel" with -- channels --

Signed and Sealed this

Fourth Day of September, 2001

*Attest:*

*Attesting Officer*

NICHOLAS P. GODICI
*Acting Director of the United States Patent and Trademark Office*